G. AUSTIN.
Cheese Vat.
No. 62,991.
Patented March 19, 1867.
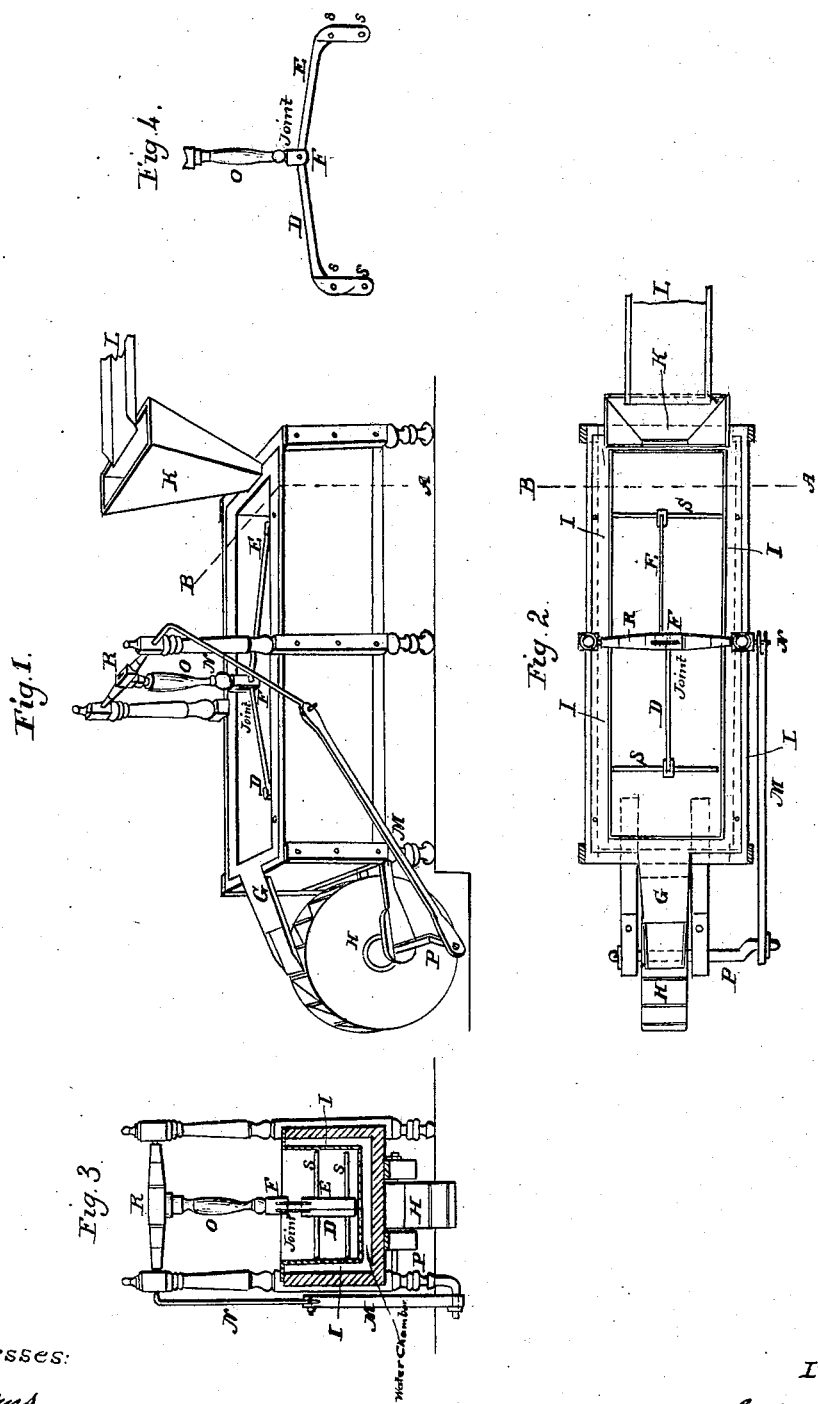

United States Patent Office.

GRINMON AUSTIN, OF DENMARK, NEW YORK.

Letters Patent No. 62,991, dated March 19, 1867.

---

IMPROVEMENT IN CHEESE VATS.

---

The Schedule referred to in these Letters Patent and making part of the same.

---

Be it known that I, GRINMON AUSTIN, of Denmark, in the county of Lewis, and State of New York, have invented a new and useful Improvement in Cheese Vats; and I do hereby declare that the following is a full, clear, and exact description thereof, reference being had to the annexed drawings, making a part of this specification, in which—

Figure 1 is a perspective view
Figure 2, a general plan.
Figure 3, a transverse section in the line A B.
Figure 4, a side elevation of the rakes.

D and E are rakes connected with the bar O by the slot joints F. G is a chute or spout through which the water is delivered on the water-wheel H after its effect in cooling the milk in the vat, and being then waste water from the hollow chamber I, formed by the wooden vat and the sheet-tin lining thereof. K is a receiver or funnel, through which the water from the conduit L is passed into the water chamber I, the conduit L being in connection with the supply of water used for the purposes of the cheese factory, &c. M is a connecting-rod from the water-wheel H, and geared to a crank on the axis of same, and joined by a movable joint to the rod N, which rod N is joined to the axle R. O is a bar framed in the axle R, and receives through the crank P on the axis of the water-wheel H an oscillating motion when the water-wheel H is revolving. S S are rods inserted at the end of the rakes, and are in fact a part of the rakes, as may be seen on inspection of the transverse section, fig. 3.

The nature of my invention consists is providing the ordinary cheese vats with self-acting rakes, driven by the waste water used for cooling the milk during the time of its delivery, a period of from eleven to twelve hours, instead of working the common rake by hand as is now the custom, and thereby dispensing with one man's labor for a duration of from five to seven hours on each operation of cheese making. The form of the rakes and uniform action of them is also claimed as an improvement, being superior to the intermittent manual action of the rake as now used. And further, the motion imparted to my improved rake, and through it to the milk in the vat, brings each globule of the milk in more frequent and constant contact with the tin lining against which the cold water is in constant flow, and consequently has a superior tendency to keep the whole volume of milk in the vat cool, and so prevents the rising of the cream and souring of the milk until such time as the cheese making commences.

To enable others skilled in the art to make and use my invention, I will proceed to describe its construction and operation.

I construct my cheese vats in any of the known forms and sizes, and apply thereto a water-wheel or other motive power driven by the waste water passing between the wooden box and the sheet-tin lining, which together form the vat, or drive the water-wheel direct from the factory stream or water supply, as may be most convenient. Over the centre of the vat the oscillating bar O, framed into the axle R, (which axle is geared to the stanchions attached to the sides of the vat,) obtains the necessary motion from the water-wheel by means of the crank P and the bar M and rod N, as will be seen on reference to the accompanying drawings. On the bottom of the bar O are two slots, F, in which the longitudinal parts of the rakes are movably connected. Short stout pieces of wood are framed into the other ends of this longitudinal part of the rakes, and two cross-rods, S S, are inserted into the short stout pieces described and at right angles to the longitudinal parts of the rakes, so that thus the two rakes are joined at F, and will have a vertical motion from their buoyancy, and a horizontal motion from the crank on the axis of the water-wheel or other motive power.

What I claim as my invention, and desire to secure by Letters Patent, is—

The within-described device for cooling milk, so constructed that the water which passes around the milk-receiver to cool the same will act upon a wheel or equivalent device, operating the parts, which causes continuous agitation to the milk, substantially as specified.

GRINMON AUSTIN.

Witnesses:
G. E. COLLINS,
A. G. DAYAN.